United States Patent
Hirose

(12) United States Patent (10) Patent No.: US 7,897,242 B2
Hirose (45) Date of Patent: Mar. 1, 2011

(54) INJECTION MOLDED ARTICLE

(75) Inventor: Kazuya Hirose, Minowa-machi (JP)

(73) Assignee: Olympus Corporation, Tokyo (JP)

( * ) Notice: Subject to any disclaimer, the term of this patent is extended or adjusted under 35 U.S.C. 154(b) by 1179 days.

(21) Appl. No.: 11/237,402

(22) Filed: Sep. 28, 2005

(65) Prior Publication Data
US 2006/0083880 A1 Apr. 20, 2006

(30) Foreign Application Priority Data
Oct. 14, 2004 (JP) .............................. 2004-299482

(51) Int. Cl.
*B32B 3/30* (2006.01)
(52) U.S. Cl. ...................................... 428/141; 396/529
(58) Field of Classification Search .................. 428/141; 396/529
See application file for complete search history.

(56) References Cited
U.S. PATENT DOCUMENTS
5,950,021 A * 9/1999 Suzuki et al. .................. 396/87

FOREIGN PATENT DOCUMENTS

| JP | 44-3022 | 2/1969 |
| JP | 59-73728 | 5/1984 |
| JP | 1-235391 | 9/1989 |
| JP | 06-055597 | 3/1994 |
| JP | 11-086353 | 3/1999 |
| JP | 2002-036309 | 2/2002 |

* cited by examiner

*Primary Examiner*—William P Watkins, III
(74) *Attorney, Agent, or Firm*—Straub & Pokotylo; John C. Pokotylo

(57) ABSTRACT

A plurality of undulations are continuously formed on a front surface and a back surface of at least a beam portion in an injection molded article, and warpage generated by molding is prevented. Injection molding of the present invention is effective for, for example, prevention of the warpage of a beam generated by influences of light intercepting ridges formed on an inner surface of a lens barrel or the like.

12 Claims, 12 Drawing Sheets

Fig. 18A
Fig. 18B
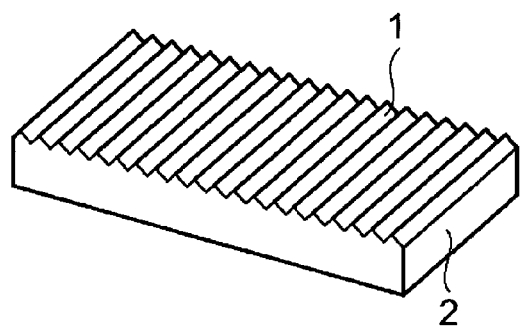
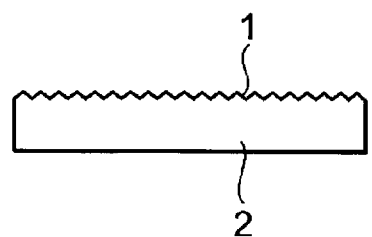
Fig. 19
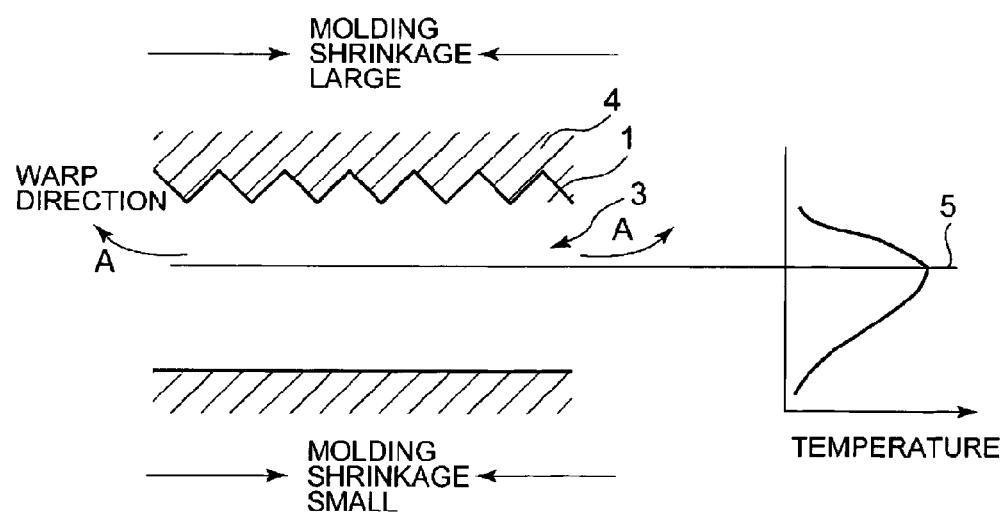

INJECTION MOLDED ARTICLE

CROSS-REFERENCE TO RELATED APPLICATION

This application is based upon and claims the benefit of priority from prior Japanese Patent Application No. 2004-299482, filed Oct. 14, 2004, the entire contents of which is incorporated herein by reference.

BACKGROUND OF THE INVENTION

1. Field of the Invention

The present invention relates to an injection molded article of a resin. The present invention relates more particularly to an injection molded article which can be applied to an optical component such as a lens barrel or a finder in an optical device such as a camera or a microscope.

2. Description of the Related Art

Many of optical components such as a lens barrel and a finder of a camera are molded of a resin by injection molding. On a surface facing an optical axis such as an inner surface of the injection molded optical component, in many cases, light intercepting ridges for preventing reflection of light on the surface are formed.

As shown in FIG. 18, light intercepting ridges 1 are formed in such a manner as to repeat wavy undulations periodically on one surface of an optical component 2. In a camera component, the ridges are formed in such a manner that, for example, a pitch is about 1 mm long and amplitude is about 0.3 mm height.

When undulations such as the light intercepting ridges are formed at an injection molding time, there are sometimes generated a deformation such as warpage attributable to the undulation in a molded article. FIGS. 19 and 20 are explanatory views of causes for the warpage. FIGS. 19 and 20 show on a left side the inside of a cavity immediately before the article is removed from a mold after the injection molding. FIGS. 19 and 20 show on a right side a temperature distribution graph of the resin in the cavity, the ordinate shows a position in a plate thickness direction along which the undulation is formed, and the abscissa shows a temperature. FIG. 19 shows a case where the light intercepting ridges 1 are deep, and FIG. 20 shows a case where the light intercepting ridges 1 are shallow.

In a case where the light intercepting ridges 1 are deep as shown in FIG. 19, an area of a resin 3 brought into contact with a mold 4 is large in the vicinity of the light intercepting ridge 1, and therefore a resin temperature of a contact portion drops. On the other hand, since the resin in the vicinity of the light intercepting ridge 1 at a low temperature functions as an insulating material, heat of the resin of the portion slightly inward the light intercepting ridge 1 is not easily conducted to the mold 4. As a result, in the graph, a temperature curve is asymmetrical to a temperature peak 5. As shown on the right side of FIG. 19, a portion of the molded article in the vicinity of the light intercepting ridge 1 is set at a temperature which is slightly higher than that of a central portion of the cavity. Therefore, a molding shrinkage in the vicinity of the light intercepting ridge 1 is larger than that in the vicinity of the side opposite to the light intercepting ridge 1, and an upward warpage is generated in the molded article as shown by an arrow A.

In a case where the light intercepting ridge 1 is shallow as shown in FIG. 20, the area of the resin 3 brought into contact with the mold 4 is large in the vicinity of the light intercepting ridge 1 in the same manner as in FIG. 19. However, since the light intercepting ridge 1 is shallow, the resin functioning as the insulating material at the low temperature has a small amount, and is distributed in periphery of the cavity as compared with a situation of FIG. 19. Therefore, the heat of the resin of the portion slightly inward from the light intercepting ridge 1 is less prevented from being conducted to the mold. Therefore, the heat of the resin is more easily conducted to the mold 4 on a light intercepting ridge 1 side of the molded article as compared with the opposite side. As shown on the right side of FIG. 20, the temperature of the portion closer to the light intercepting ridge 1 than the central portion of the cavity is slightly lower than the previous case. Therefore, the molding shrinkage in the vicinity of the side opposite to the light intercepting ridge 1 is larger than that in the vicinity of the light intercepting ridge 1, and a downward warpage is generated in the molded article as shown by an arrow B.

To cope with the above-described warpage, in Japanese Patent Application Laid-Open No. 2002-36309, a temperature difference is made between a fixed mold and a movable mold to thereby control a distribution of a resin temperature. In Japanese Patent Application Laid-Open No. 6-55597, the resin temperature is controlled between the vicinity of a gate and a flow terminal end portion of the resin.

BRIEF SUMMARY OF THE INVENTION

An injection molded article of the present invention has a beam, and a plurality of undulations are repeatedly formed on at least opposing surfaces (one surface and the opposite surface thereof) of a beam portion. Consequently, occurrence of warpage can be reduced in a beam portion in which warpage attributable to a difference of a molding shrinkage easily occurs.

Obviously, in a case where the injection molded article has a plurality of beams, the undulations do not have to be formed on all of the beams. The undulations may be formed on the opposing surfaces of an only specific beam (e.g., a beam having a large warpage influence).

Moreover, a plurality of undulations of opposing surfaces may not be provided on a portion other than the beam portion. In this case, the man-hour required for mold forming is small, and the article can be economical.

The beam may be either a cantilever or center impeller one.

A plurality of undulations formed on the opposing surfaces may be formed into the same shape. In this case, since a temperature distribution of the resin is substantially the same, there is an only small difference between molding shrinkages of the opposing surfaces, and the warpage can be prevented more effectively.

The shapes of the plurality of undulations formed on the opposing surfaces may be wave shapes in which a pitch of one surface deviates from that of the back surface. In other words, the both waves have the same wavelength but have different phases. In such a case, it is easy to keep a constant thickness along the article.

A first portion which is not the beam may be formed into a cylindrical shape. Such example corresponds to a case where a frame member of a lens barrel is regarded as the injection molded article. Moreover, a plurality of undulations are formed on opposing surfaces of at least a second portion which is the beam. For example, when light intercepting ridges are formed on an inner surface of a lens barrel, the undulations similar to the light intercepting ridges are also formed on an outer surface of the lens barrel. This can prevent warpage of the beam portion.

Needless to say, the undulations may be formed on opposite sides of the only protruded beam portion, but the undulations may be formed on a part of a cylindrical surface. The beam may have either a flat surface shape or a circular section.

Obviously, in the present invention, the portion in which a plurality of undulations are formed is not limited to the beam, and may be applied to a portion having a surrounded periphery.

BRIEF DESCRIPTION OF THE SEVERAL VIEWS OF THE DRAWINGS

These and other features, aspects, and advantages of the apparatus and methods of the present invention will become better understood with regard to the following description, appended claims, and accompanying drawings where:

FIG. 18A is a perspective view of a molded article on which conventional undulations are formed;

FIG. 18B is a front view of the molded article on which the conventional undulations are formed;

FIG. 19 is a diagram showing a mechanism in which the warpage is generated; and

DETAILED DESCRIPTION OF THE PREFERRED EMBODIMENTS

Figure 1A:
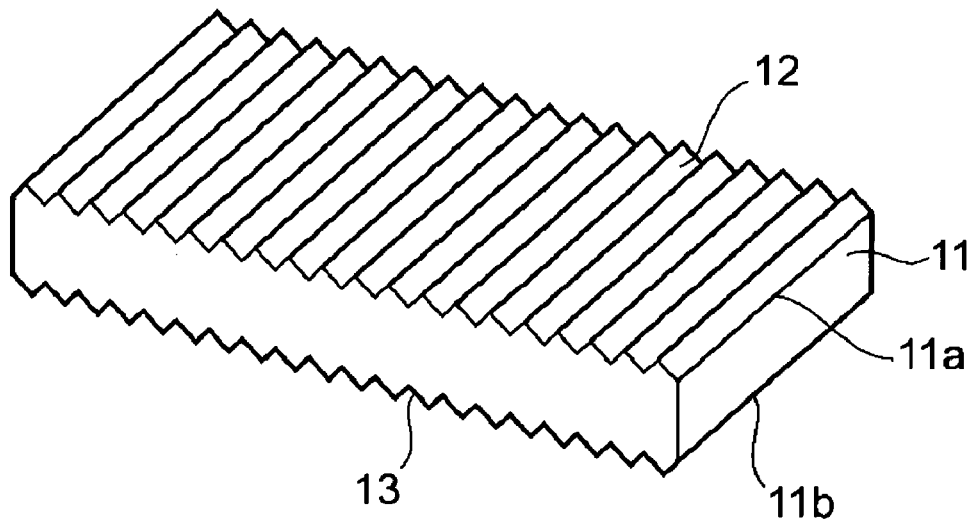
FIG. 1A is a perspective view showing a first configuration in a first embodiment of the present invention.

Preferred embodiments of the invention are described below with reference to the accompanying drawings.

It is to be noted that in embodiments, the same member is denoted with the same reference numeral.

In the present invention, a plurality of periodically repeated undulations are formed on the surface (front surface) of a molded article made by injection molding of a resin. Moreover, a plurality of periodically repeated undulations corresponding to the above-described undulations are formed on a back surface. The undulations of the front and back surfaces are formed at a time of the injection molding of the molded article. FIGS. 1A to 3D show configurations in a first embodiment of the present invention. In these configurations, the injection molded article has a flat plate shape, and a plurality of undulations are formed on the opposing surfaces of the article.

Figure 1B:
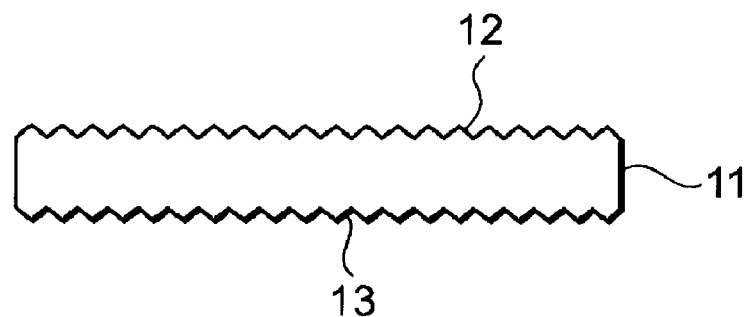
FIG. 1B is a front view showing the first configuration in the first embodiment of the present invention.
Figure 1C:
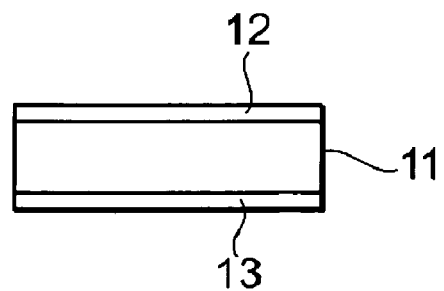
FIG. 1C is a side view showing the first configuration in the first embodiment of the present invention.

In a first configuration of FIGS. 1A to 1C, a plurality of periodically repeated undulations 12 are formed in such a manner as to continue in a longitudinal direction on an upper surface 11a which is a first surface of a molded article 11 having a flat plate shape. Furthermore, a plurality of periodically repeated undulations 13 corresponding to the undulations 12 of the upper surface are formed on a lower surface 11b which is a second surface in such a manner as to continue in the longitudinal direction. The molded article 11 is formed by the injection molding of a thermoplastic resin, and the undulations 12, 13 are formed at the time of the injection molding of the molded article 11.

In the undulations 12, 13 of the upper and lower surfaces, crest and valley portions are formed in such a manner as to repeat alternately and extend in the same direction, and the same undulations 12, 13 are formed on the both sides. These undulations 12, 13 correspond to light intercepting ridges of an optical component. Since the same undulations 12, 13 are formed on the upper and lower surfaces of the molded article 11, a resin temperature distribution in the molded article 11 during the injection molding of the resin in a mold becomes substantially symmetrical between the front surface side and back surface side. Therefore, no difference of the molding shrinkage is generated and no warpage is generated in the molded article 11.

Figure 2A:
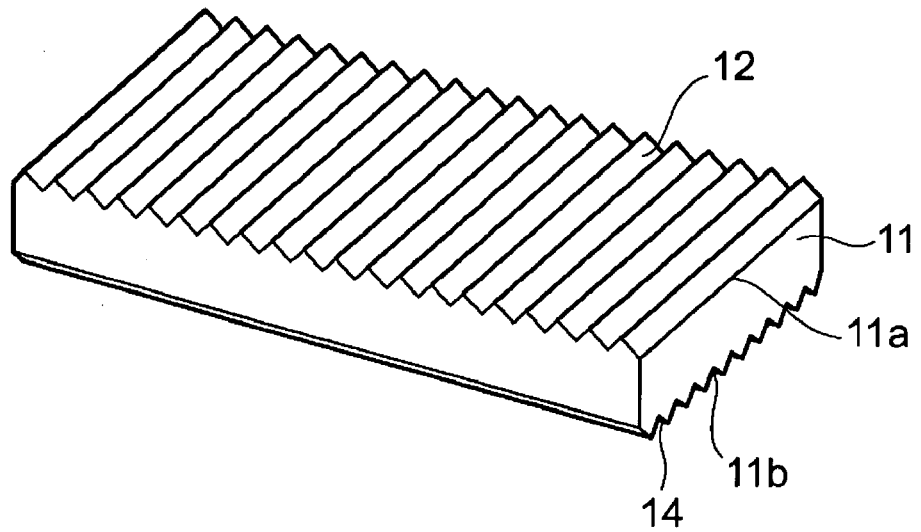
FIG. 2A is a perspective view showing a second configuration in the first embodiment of the present invention.
Figure 2B:
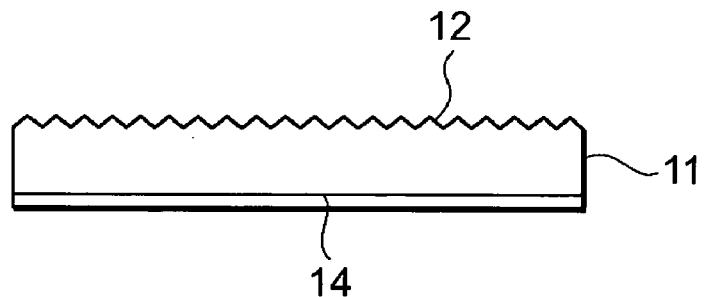
FIG. 2B is a front view showing the second configuration in the first embodiment of the present invention.
Figure 2C:
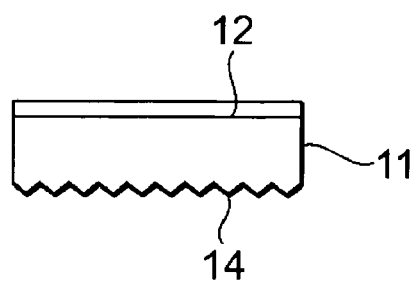
FIG. 2C is a side view showing the second configuration in the first embodiment of the present invention.
Figure 3A:
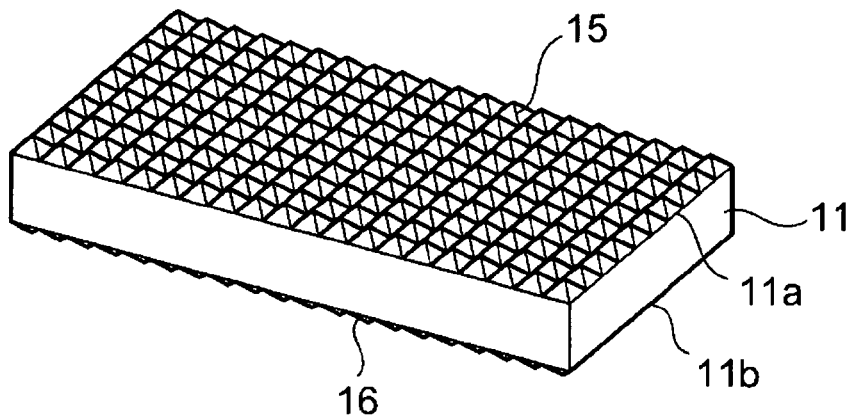
FIG. 3A is a perspective view showing a third configuration in the first embodiment of the present invention.
Figure 3B:
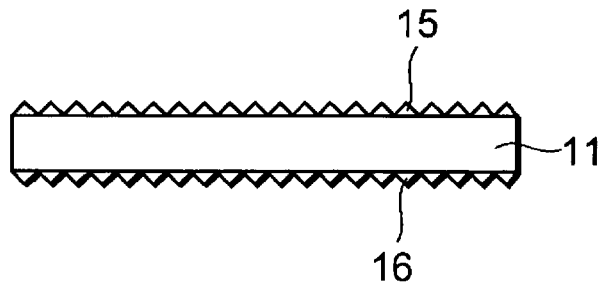
FIG. 3B is a front view showing the third configuration in the first embodiment of the present invention.
Figure 3C:
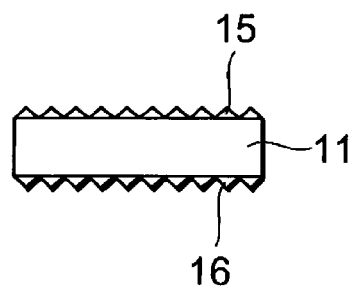
FIG. 3C is a side view showing the third configuration in the first embodiment of the present invention.
Figure 3D:
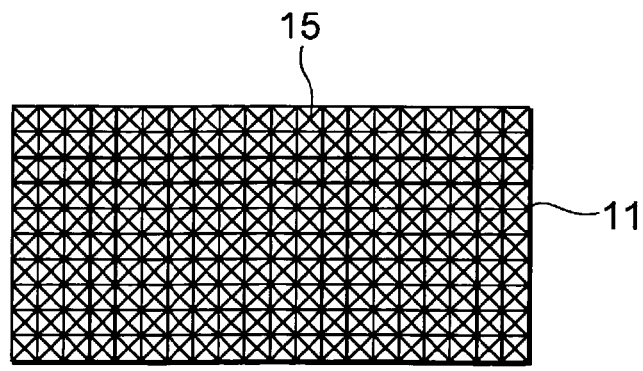
FIG. 3D is a plan view showing the third configuration in the first embodiment of the present invention.

Also in a second configuration of FIGS. 2A to 2C, a plurality of undulations 12, 14 are formed on an upper surface 11a which is a first surface of the molded article 11 having a flat plate shape, and a lower surface 11b which is the back surface of the upper surface 11a. In this second configuration, the plurality of undulations 14 of the lower surface 11b are formed in a direction crossing the plurality of undulations 12 of the upper surface 11a at right angles. That is, the crest and valley portions of the undulations 14 of the lower surface 11b extend in a direction perpendicular to a direction in which the crest and valley portions of the undulations 12 of the upper surface 11a extend. Even when the undulations 12, 14 extend in different directions in this manner, the resin temperature distribution inside the molded article 11 on the front-surface side is substantially the same as that on the back-surface side. Therefore, no difference of the molding shrinkage is generated and no warpage is generated in the molded article 11.

In this case, in the first configuration shown in FIGS. 1A to 1C, a direction of the upper surface 11a bound by the mold when the resin is molded and contracted is the same as that of the lower surface 11b. Therefore, the first configuration is preferably applied to a crystalline resin such as a polyacetal resin or polyethylene having a large molding shrinkage. On the other hand, the configuration shown in FIGS. 2A to 2C is preferably applied to an amorphous resin such as a polycarbonate resin or an ABS resin having a comparatively small molding shrinkage. Needless to say, even the first configuration may be applied to the amorphous resin, and even the second configuration may be applied to the crystalline resin.

In a third configuration of FIGS. 3A to 3D, undulations 15, 16 constituted of continuous twill lines are formed on the upper surface 11a and the lower surface 11b of the molded article 11 having the flat plate shape. The undulations 15, 16 are made such that micro quadrangular pyramids are formed continuously in a plane direction on the upper and lower surfaces 11a, 11b, and the upper and lower surfaces 11a, 11b have the same undulations. Accordingly, since the resin temperature distribution in the molded article 11 on the front-surface side is substantially the same as that on the back-surface side, therefore no difference of the molding shrinkage of the resin is generated, and no warpage is generated in the molded article 11.

The undulations formed on one surface of the molded article 11, and the undulations formed on the corresponding back surface are not limited to the above-described shapes. The generation of the warpage in the molded article can be similarly prevented by, for example, dimples and screw threads constituted of continuous spherical undulations or any other shape.

Figure 4:
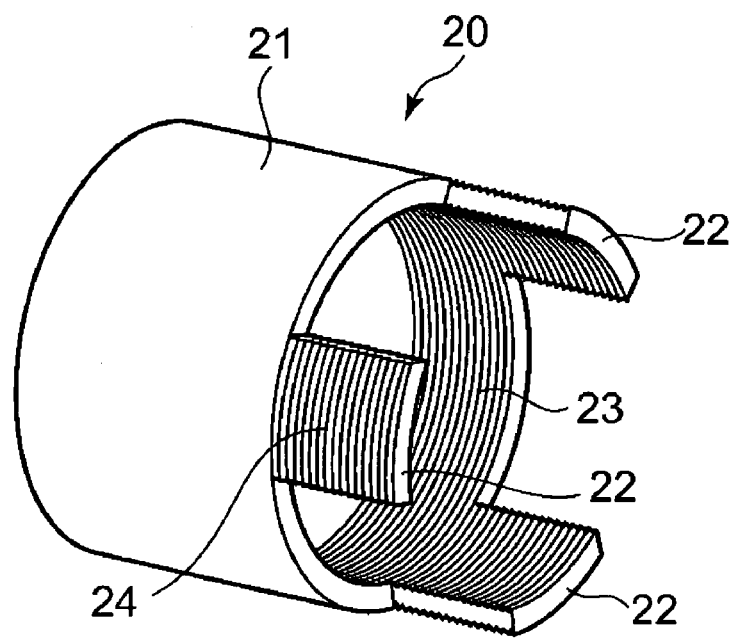
FIG. 4 is a perspective view showing a second embodiment of the present invention.

FIG. 4 shows a second embodiment of the present invention. In the second embodiment, the present invention is applied to a lens barrel 20 of a camera.

The lens barrel 20 has a cylindrical barrel portion 21 into which a plurality of lenses are inserted and fixed, and extended portions 22 of the barrel portion 21 extending from one end side in an axial direction, and the barrel is molded by injection molding of a resin. The extended portions 22 extend integrally from the barrel portion 21 in such a manner as to be disposed in three equally divided positions on a circumference, and are cantilever beam portions with respect to the barrel portion 21. Light intercepting ridges 23 as continuous undulations are formed on an inner peripheral surface of the barrel portion 21 and continued inner peripheral surfaces of the extended portions 22. Accordingly, light is prevented from being reflected by an inner periphery of the barrel portion 21. The light intercepting ridges 23 are formed into, for example, wave shapes having a pitch of about 1 mm and an amplitude of about 0.3 mm.

An outer peripheral surface of each extended portion 22 of the lens barrel 20 is a back surface of the inner peripheral surface of the extended portion 22, and pseudo light intercepting ridges 24 corresponding to the light intercepting ridges 23 are formed on each outer peripheral surface. The pseudo light intercepting ridges 24 are formed in such a manner as to extend in the same direction with a pitch and an amplitude which are equal to those of the light intercepting ridges 23. The light intercepting ridges 23 and the pseudo light intercepting ridges 24 are formed at a time of injection molding of the lens barrel 20.

The light intercepting ridges 23 are formed on the inner peripheral surface of each extended portion 22, and the pseudo light intercepting ridges 24 are formed on the outer peripheral surface at the injection molding time of the lens barrel 20. Consequently, since a resin temperature distribution on an inner peripheral side of the extended portion 22 is substantially the same as that on an outer peripheral side, no difference of a molding shrinkage of the resin is generated, and no warpage is generated in the extended portion 22. Especially in the second embodiment, since the extended portion 22 is a cantilever beam portion, warpage may be easily generated during the injection molding, but the warpage can be prevented, when the pseudo light intercepting ridges 24 corresponding to the light intercepting ridges 23 are formed.

Figure 5:
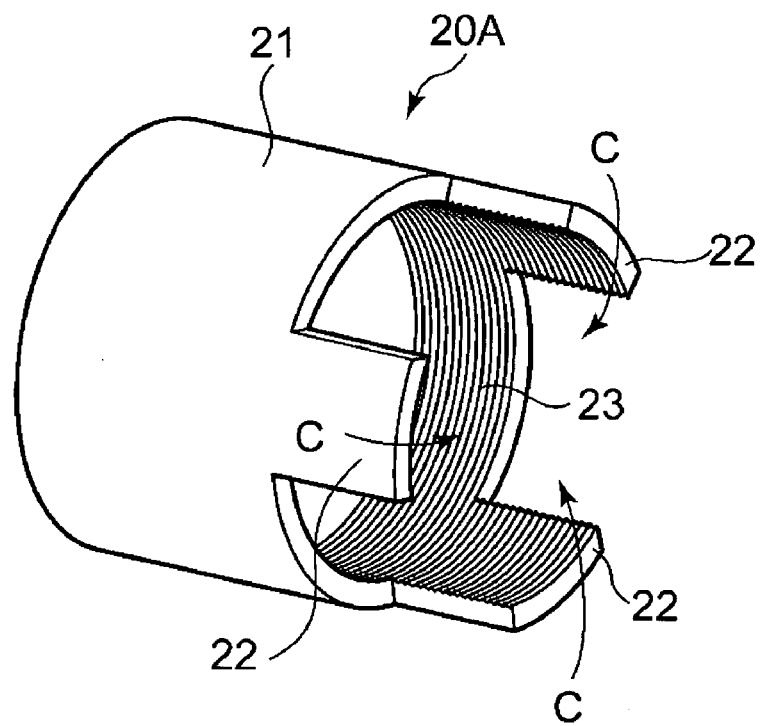
FIG. 5 is a perspective view showing a comparative example of the second embodiment.

FIG. 5 shows a lens barrel 20A in which any pseudo light intercepting ridge 24 is not formed on the extended portions 22. In this case, the warpage is generated in arrow C directions or in directions opposite to arrows C, and a problem occurs such that the lens barrel 20 cannot be assembled with another fitting lens barrel.

Figure 6A:
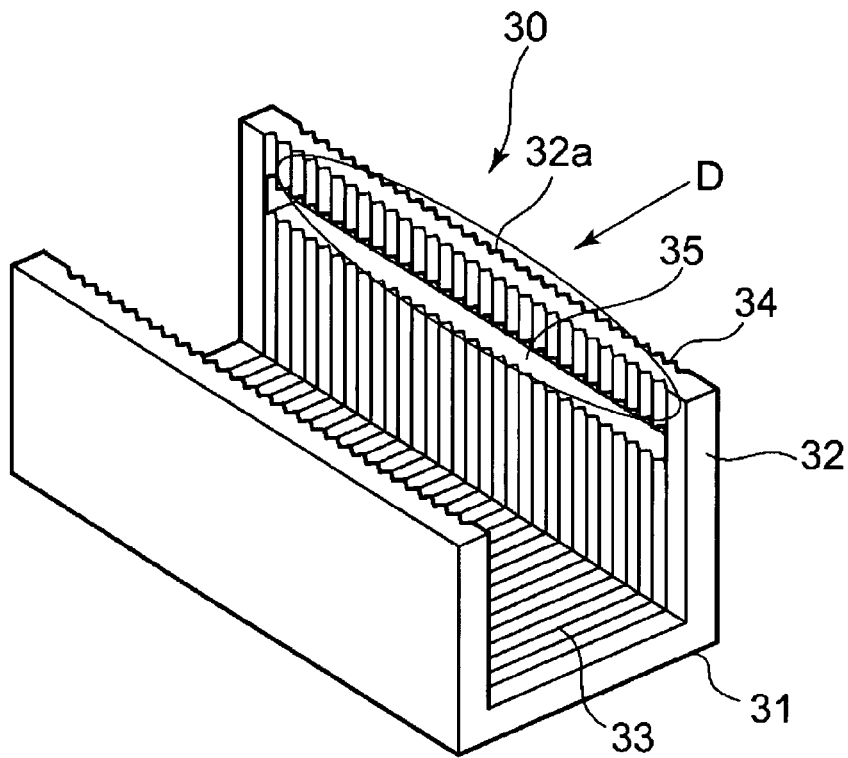
FIG. 6A is a perspective view showing a third embodiment of the present invention.
Figure 6B:
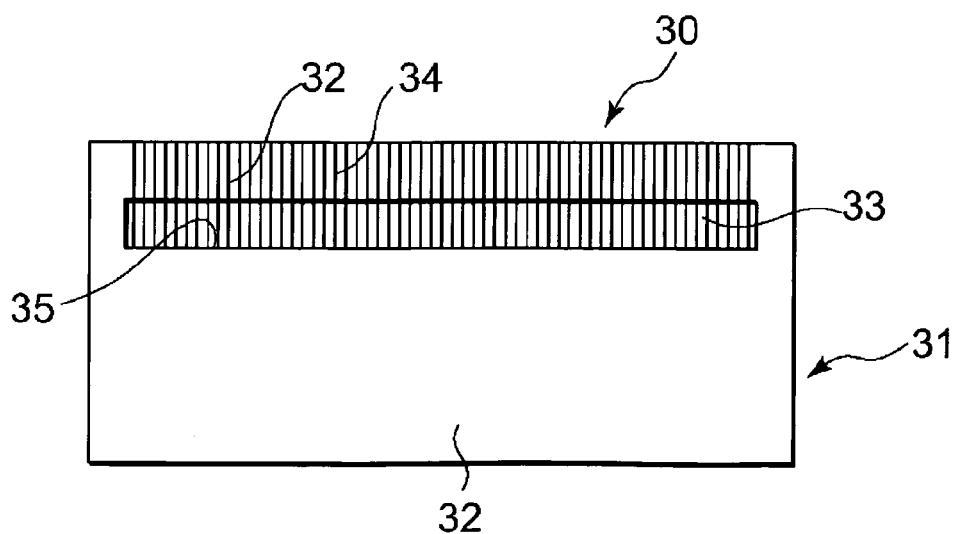
FIG. 6B is an arrow-view side view showing the third embodiment of the present invention.

FIGS. 6A and 6B show a third embodiment of the present invention. In this third embodiment, the present invention is applied to a finder frame 30 of a camera.

The finder frame 30 has a U-shaped frame member 31, and light intercepting ridges 33 are formed on an inner surface of the member. The frame member 31 has a pair of facing pieces, and a transversely long opening 35 is formed in one of facing pieces 32. The opening 35 is formed in such a manner as to be positioned in the middle of the facing piece 32 in a height direction. An end portion (upper end portion) 32a of the facing piece 32 above the opening 35 on a free side is a center impeller beam portion in which warpage may be easily generated.

The light intercepting ridges 33 are formed on the whole inner surfaces of the facing pieces 32, and the light intercepting ridges 33 are therefore formed also on the upper end portion 32a. In this third embodiment, pseudo light intercepting ridges 34 are formed on the outer surface that is the back surface of the inner surface of the facing piece 32. The pseudo light intercepting ridges 34 correspond to the light intercepting ridges 33 on the inner-surface side, and are formed in such a manner as to extend in the same direction with the similar pitch and amplitude. The pseudo light intercepting ridges 34 are formed on the outer surface of the upper end portion 32a of the facing piece 32.

When the pseudo light intercepting ridges 34 corresponding to the light intercepting ridges 33 on the inner surface side of the facing piece 32 are formed on the outer surface of the upper end portion 32a of the facing piece 32 in this manner, corresponding undulations are formed on inner and outer surfaces of the upper end portion 32a of the facing piece. Therefore, a resin temperature distribution in the upper end portion 32a on the inner surface side is substantially the same as that on the outer surface side, no difference of a molding shrinkage of a resin is generated, and no warpage is generated in the upper end portion 32a.

Figure 7A:
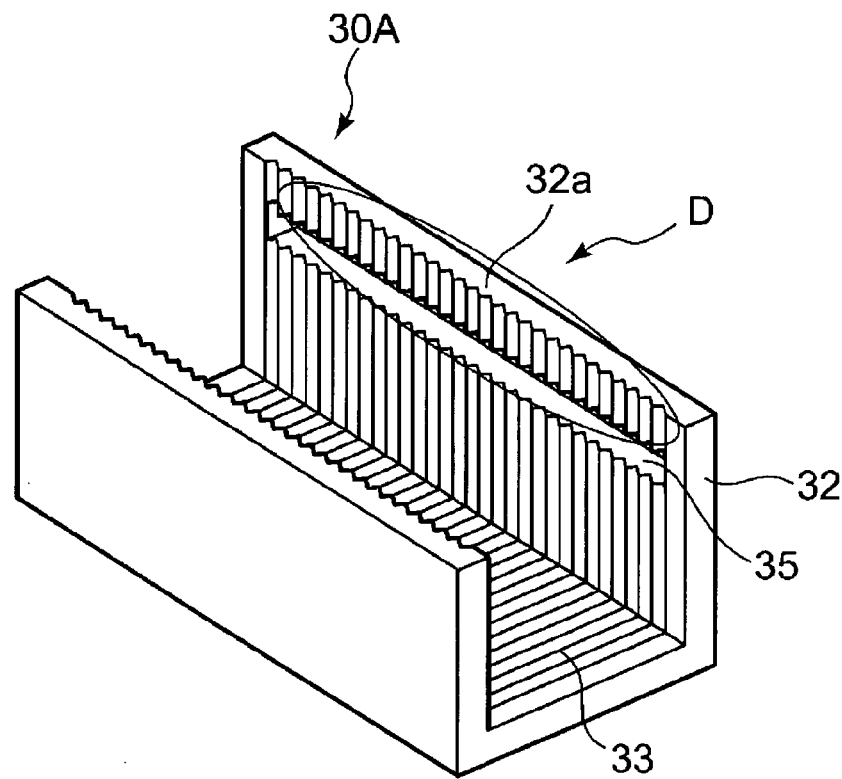
FIG. 7A is a perspective view showing a comparative example of the third embodiment.
Figure 7B:
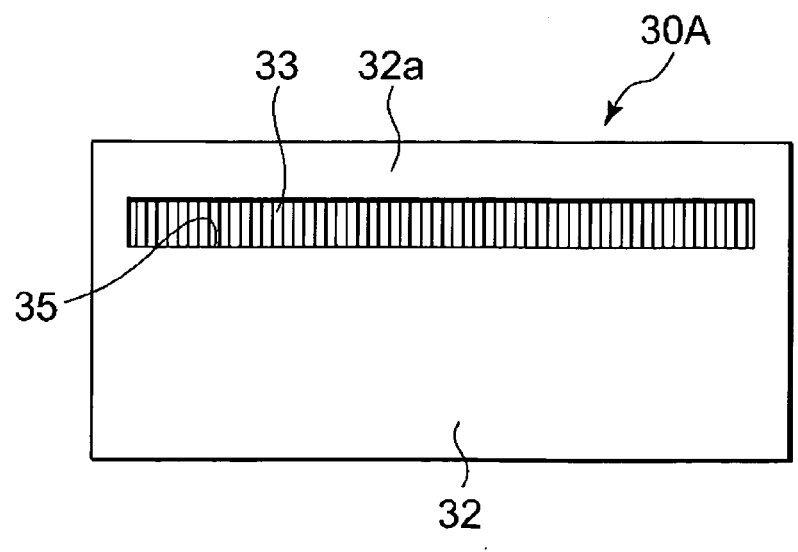
FIG. 7B is an arrow-view side view showing a comparative example of the third embodiment.

FIG. 7 shows a finder frame 30A in which any pseudo light intercepting ridge 34 is not formed on the upper end portion 32a in the third embodiment. In this case, warpage is generated in the upper end portion 32a, and the frame becomes a defective part.

Figure 8A:
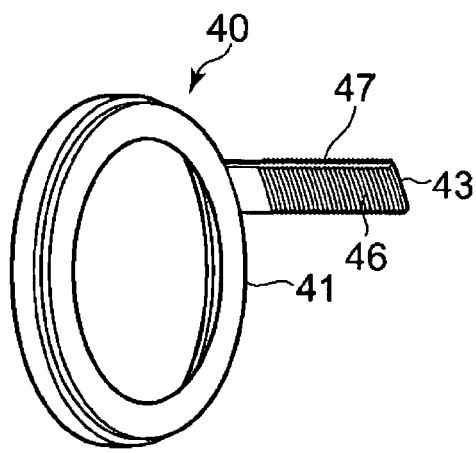
FIG. 8A is a perspective view showing a fourth embodiment of the present invention.
Figure 8B:
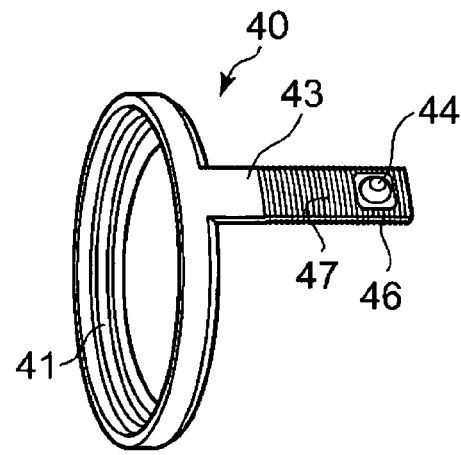
FIG. 8B is a perspective view from a back surface, showing the fourth embodiment of the present invention.
Figure 9:
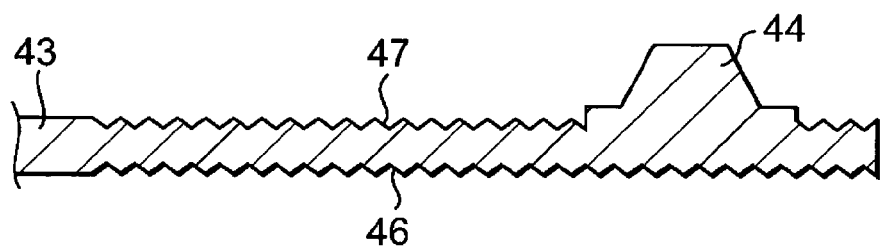
FIG. 9 is a sectional view of a leg portion of FIG. 8.

FIGS. 8A, 8B, and 9 show a fourth embodiment in which the present invention is applied to a lens frame 40 which is a type of lens barrel component of a camera.

This lens frame 40 of the fourth embodiment comprises: an annular lens insertion frame 41 into which a lens is inserted and fixed; a leg portion 43 extending from the lens insertion frame 41 in an optical axis direction; and a cam follower 44 which is formed in the leg portion 43 and which engages with a cam of another lens barrel, and they are integrally formed by injection molding of a resin.

The leg portion 43 extends from the lens insertion frame 41, and a distal tip portion is constituted as a free end. Accordingly, the leg portion is a cantilever beam portion with respect to the lens insertion frame 41. In the fourth embodiment, light intercepting ridges 46 are formed on a part of the inner surface which is the surface of the leg portion 43 on an optical axis side. The light intercepting ridges 46 have a plurality of micro wave shapes across the leg portion 43. In addition, pseudo light intercepting ridges 47 corresponding to the light intercepting ridges 46 and having the same shapes as the light intercepting ridges are formed on a part of an outer peripheral side of the leg portion 43. The pseudo light intercepting ridges 47 are formed on an outer surface which is the back surface of the inner surface of the leg portion 43, and are formed into the same shapes as those of the light intercepting ridges 46 of the inner surface.

When the light intercepting ridges 46 and the pseudo light intercepting ridges 47 are formed on the opposing surfaces of the leg portion 43 in this manner, a resin temperature distribution in the leg portion 43 on an inner surface side is substantially the same as that on an outer surface side, no difference of the molding shrinkage of the resin is generated, and no warpage is generated in the leg portion 43. Therefore, even in the cantilever beam portion in which the warpage may be easily generated, the warpage can be effectively prevented.

Figure 10A:
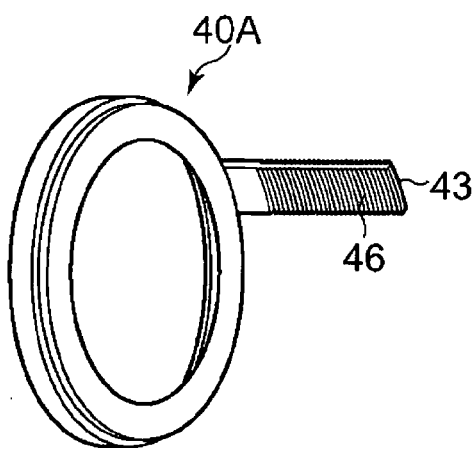
FIG. 10A is a perspective view showing a comparative example of the fourth embodiment.
Figure 10B:
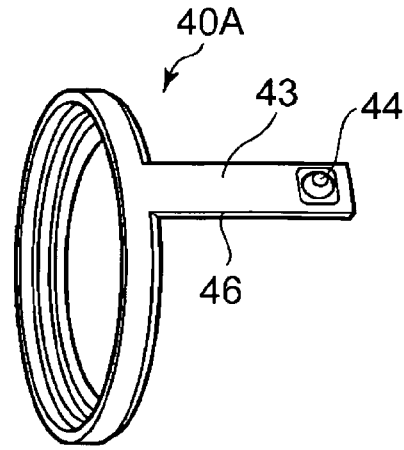
FIG. 10B is a perspective view from the back surface, showing a comparative example of the fourth embodiment.
Figure 11:
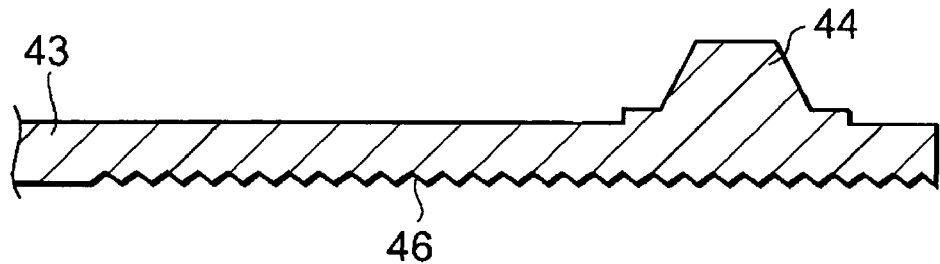
FIG. 11 is a sectional view of a leg portion of FIG. 10.

FIGS. 10A, 10B, and 11 show a lens frame 40A in which any pseudo light intercepting ridge 47 is not formed on the leg portion 43 in the fourth embodiment. In this case, undulations are formed only in the inner surface of the leg portion 43, and the outer surface has a flat surface. Therefore, a molding shrinkage of a resin in the inner surface is different from that in the outer surface, the warpage is therefore generated in a diametric direction in the leg portion 43, and the component becomes defective.

Figure 12:
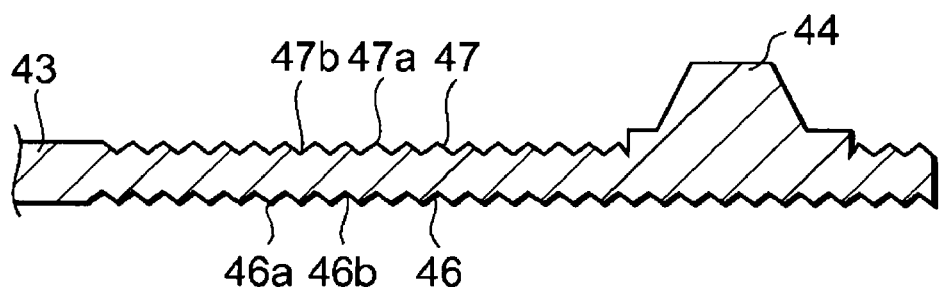
FIG. 12 is a sectional view showing a modified configuration of the fourth embodiment.
Figure 13:
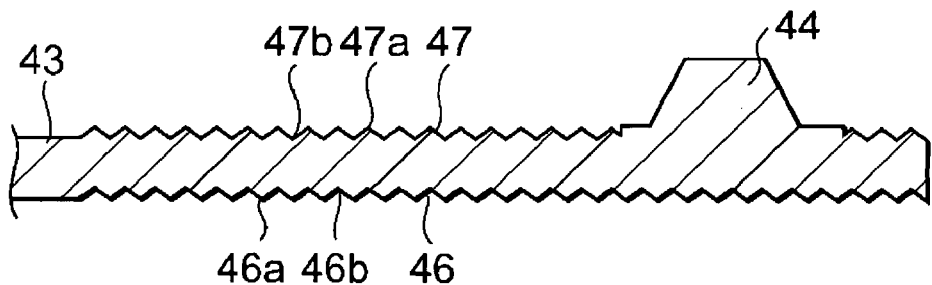
FIG. 13 is a perspective view showing another modified configuration of the fourth embodiment.

FIGS. 12 and 13 show modified configurations of the fourth embodiment. In the configuration of FIG. 12, a pitch of the pseudo light intercepting ridge 47 formed on the outer surface deviates from that of the light intercepting ridge 46 formed on the inner surface of the leg portion 43. That is, the light intercepting ridges 46 and the pseudo light intercepting ridges 47 are formed of continued micro wave shapes, valley portions 47b of the pseudo light intercepting ridges 47 correspond to crest portions 46a of the light intercepting ridges 46, and crest portions 47a of the pseudo light intercepting ridges 47 correspond to valley portions 46b of the light intercepting ridges 46. The light intercepting ridges 46 and the pseudo light intercepting ridges 47 are formed in such a manner as to deviate from each other with a 1/2 pitch.

When the pitches of the light intercepting ridges 46 and the pseudo light intercepting ridges 47 deviate in this manner, a thickness of the leg portion 43 can be secured. That is, in FIG. 9, the pitch of the light intercepting ridge 46 agrees with that of the pseudo light intercepting ridge 47. In this case, in a case where a thickness of a root portion of the leg portion 43 is 1.0 mm, an angle of the crest and valley portions is 90°, and the pitch is 0.4 mm, in addition to a thick portion of the leg portion 43 having a thickness of 1.0 mm, a thin portion having a thickness of 0.6 mm is formed. Therefore, moldability slightly degrades. On the other hand, in the configuration of FIG. 12, the thickness of the leg portion 43 is 0.8 mm on the same conditions as described above. Therefore, the thick portion can be secured, and the moldability can be improved.

In the configuration of FIG. 13, in addition to the configuration of FIG. 12, the light intercepting ridges 46 and the pseudo light intercepting ridges 47 on the inner and outer surfaces are formed in such a manner as to secure the thick root portion of the leg portion 43. Consequently, the thickness of a portion in which the light intercepting ridges 46 and the pseudo light intercepting ridges 47 are formed can be set to, for example, 1.0 mm, and the moldability can be improved more.

Figure 14:
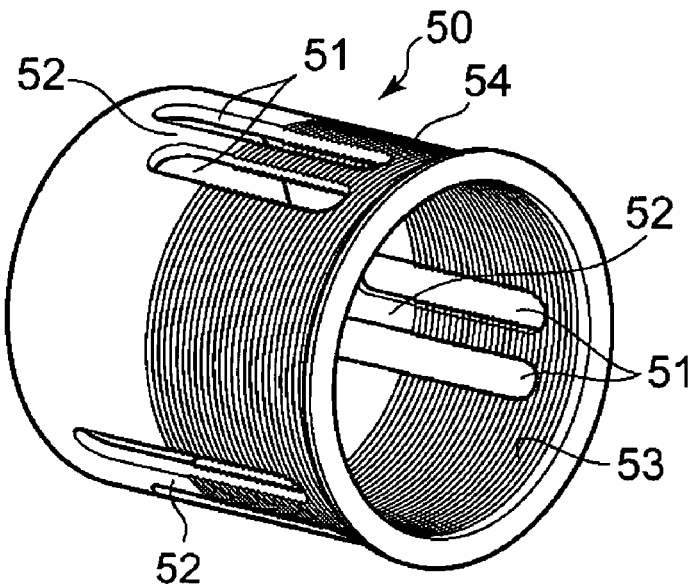
FIG. 14 is a perspective view showing a fifth embodiment of the present invention.

FIG. 14 shows a fifth embodiment to which the present invention is applied to a lens barrel 50 of a camera.

The lens barrel 50 entirely has a cylindrical shape, and long grooves 51 each extending along an axial direction for positioning a lens inserted therein are formed in six portions on a circumference. Two long grooves 51 disposed close to each other form one set, and a bridging portion 52 is formed between the set of the long grooves 51. It is to be noted that the long grooves 51 may extend in a direction other than the axial direction, such as a circumferential direction or an oblique direction.

Light intercepting ridges 53 are formed on an inner peripheral side of the lens barrel 50 facing an optical axis. In addition, pseudo light intercepting ridges 54 similar to the light intercepting ridges 53 are formed on an outer peripheral surface which is a back surface of the inner peripheral surface. The light intercepting ridges 53 and the pseudo light intercepting ridges 54 are also formed on the bridging portions 52. When the pseudo light intercepting ridges 54 corresponding to the light intercepting ridges 53 are formed in this manner, a resin temperature distribution in an inner peripheral portion (inner peripheral surface) is substantially the same as that in an outer peripheral portion (outer peripheral surface), no difference of a molding shrinkage of a resin is generated, and no warpage is generated.

Figure 15:
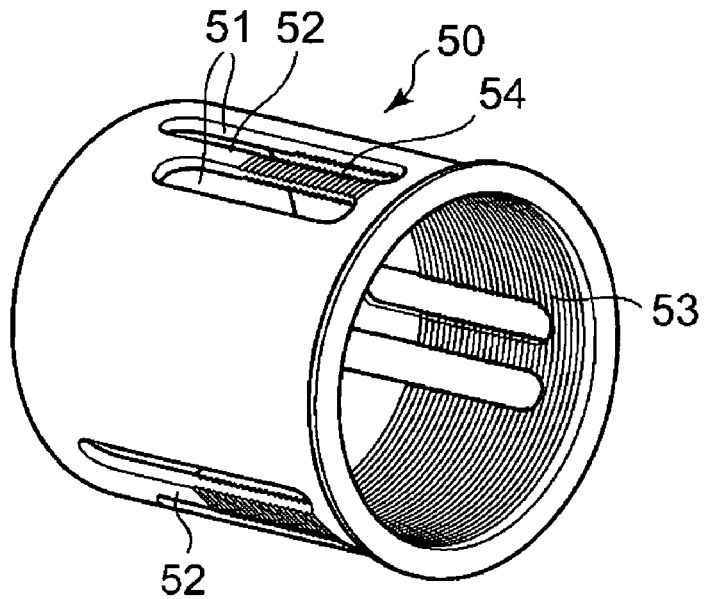
FIG. 15 is a perspective view of a modified configuration of the fifth embodiment.

FIG. 15 shows a modified configuration of the fifth embodiment. In this configuration, the pseudo light intercepting ridges 54 are formed on the outer surface of the bridging portion 52 sandwiched between the set of the long grooves 51, and any pseudo light intercepting ridge 54 is not formed on another portion of the outer surface of the lens barrel 50. Since the bridging portion 52 is a center impeller portion provided between the long grooves 51 disposed close to each other, the warpage may be easily generated in the bridging portion 52 during the injection molding, but the generation of the warpage can be prevented when the pseudo light intercepting ridges 54 are formed on the outer surface of the bridging portion 52. Therefore, in this configuration, a small area of the injection mold is shaped to be the pseudo light intercepting ridges 54. Therefore, man-hour of preparing the mold and costs can be reduced.

Figure 16:
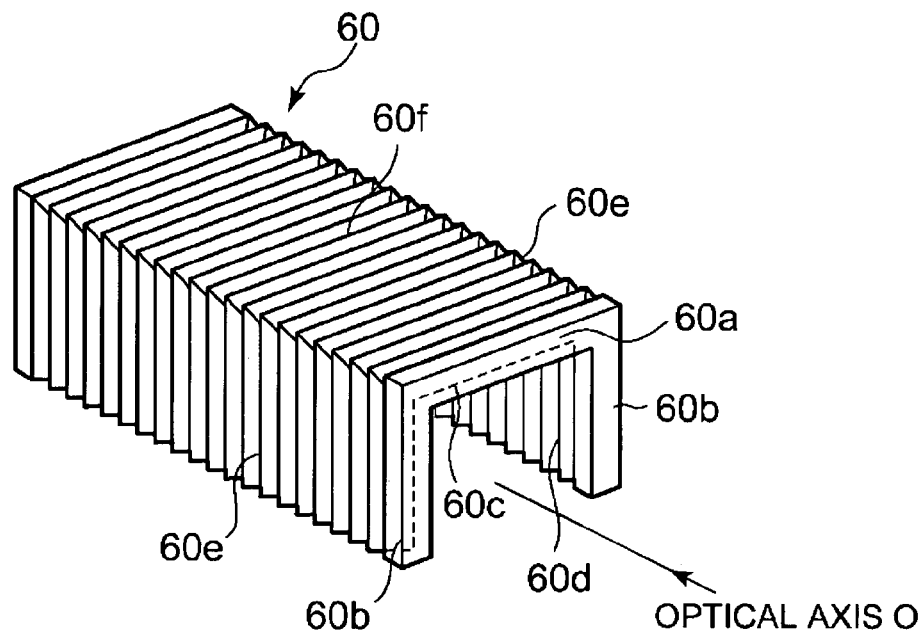
FIG. 16 is a perspective view of a finder frame in a sixth embodiment.

Next, a sixth embodiment will be described. FIG. 16 shows a finder frame for use in, for example, a camera. This finder frame is a component 60 which is molded of a synthetic resin and which has a U-shaped section.

The component 60 has a rectangular flat-plate-like bottom surface portion 60a, and a pair of flat-plate-like side wall portions 60b which extend from the bottom surface portion 60a in parallel with each other and which protrude from the bottom surface portion 60a at right angles. The portions are formed in such a manner as to surround an optical axis O. Moreover, a plurality of light intercepting ridges described above are disposed in a direction crossing the optical axis at right angles on inner and outer side surfaces of the bottom surface portion 60a and the side wall portions 60b. Specifically, light intercepting ridges 60c are formed on a U-shaped inner surface which is one surface of the bottom surface portion 60a, and pseudo light intercepting ridges 60f are disposed on an outer side surface which is the back surface of the portion. Light intercepting ridges 60d are formed on a U-shaped inner surface of each side wall portion 60b, and pseudo light intercepting ridges 60e are disposed on an outer side surface which is the back surface of the portion.

In this case, for the above-described reasons, the bottom surface portion 60a does not warp. Additionally, the flat-plate-like side wall portions 60b protruding from the bottom surface portion 60a at right angles do not incline with respect to the bottom surface portion 60a, and a desired shape can be exactly injection-molded.

Figure 17A:
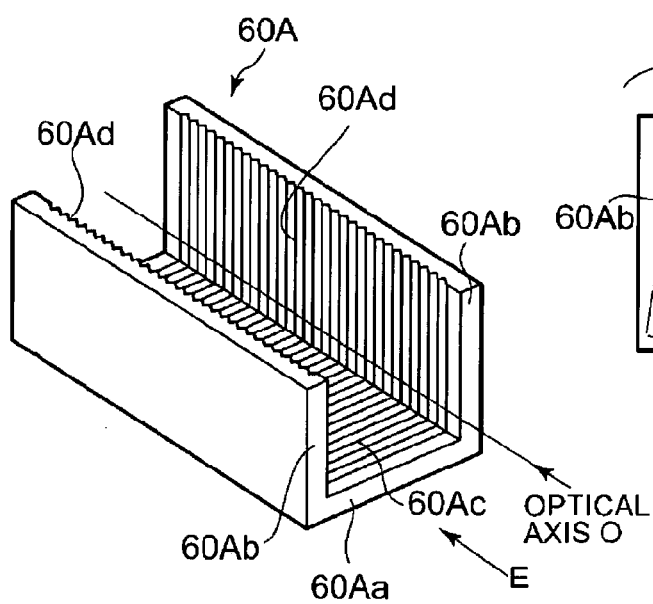
FIG. 17A is a perspective view of a comparative example of the finder frame according to the sixth embodiment.
Figure 17B:
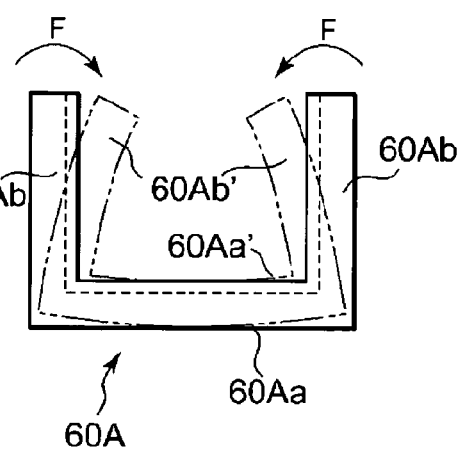
FIG. 17B is an explanatory view of a warpage in the comparative example of FIG. 17A.
Figure 20:
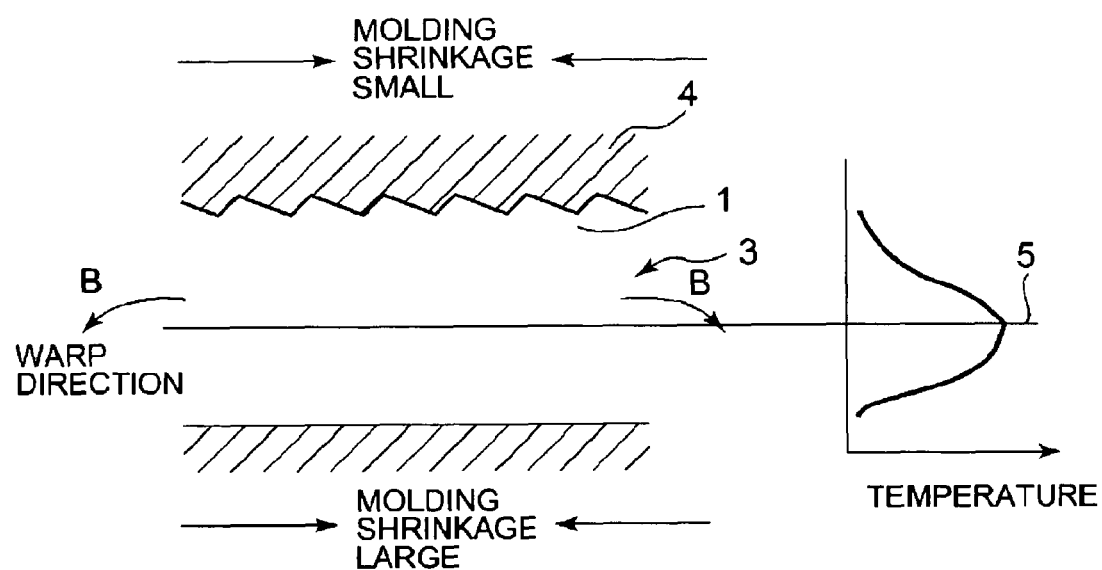
FIG. 20 is a diagram showing the mechanism in which the warpage is generated.

On the other hand, light intercepting ridges 60Ac are disposed on an inner surface side of a bottom surface portion 60Aa of a finder frame 60A which is a conventional component having a U-shaped section as shown in FIG. 17A, and light intercepting ridges 60Ad are disposed on the inner side surface of a side wall portion 60Ab. However, any pseudo light intercepting ridge is not disposed on an outer surface side of the bottom surface portion 60Aa or the side wall portion 60Ab. Accordingly, in one example, the finder frame 60A is viewed from a direction shown by an arrow E (optical axis direction) as a direction in which the light intercepting ridges are arranged as shown in FIG. 17A. In this case, a shape of the injection-molded finder frame 60A is warped and deformed in such a manner that the outer side surface of the bottom surface portion 60Aa protrudes as shown by a two-dot chain line in FIG. 17B. Therefore, the side wall portion 60Ab falls by the deformation of the bottom surface portion 60Aa only. Moreover, the side wall portion 60Ab itself is warped and deformed in such a manner as to the outer side surface protrudes. Therefore, in such conventional-example molding, a desired shape is not easily obtained.

While there has been shown and described what are considered to be preferred embodiments of the invention, it will, of course, be understood that various modifications and changes in form or detail could readily be made without departing from the spirit of the invention. It is therefore intended that the invention not be limited to the exact forms described and illustrated, but constructed to cover all modifications that may fall within the scope of the appended claims.

What is claimed is:

1. An injection molded article comprising:
   a first portion which is a partial portion of the injection molded article, wherein the first portion has a cylindrical shape; and
   a second portion which is a partial portion of the injection molded article, and which has
   a first end fixed to the first portion,
   a second end which is free,
   an inner peripheral surface extending from the first end to the second end, and including a first plurality of repeatedly formed undulations,
   an outer peripheral surface extending from the first end to the second end, and including a second plurality of repeatedly formed undulations,
   a first side edge surface arranged between the inner and outer peripheral surfaces, and
   a second side edge surface arranged between the inner and outer peripheral surfaces.

2. The injection molded article according to claim 1, wherein the first and second plurality of repeatedly formed undulations have the same shape.

3. The injection molded article according to claim 2, wherein the shape of the undulation is a wave shape in which a pitch of one surface deviates from that of a back surface.

4. The injection molded article according to claim 1, wherein the first plurality of undulations are light intercepting ridges.

5. The injection molded article according to claim 1, wherein the inner and outer peripheral surfaces of the second portion are curved.

6. An injection molded article comprising:
   a first portion which is a partial portion of the injection molded article, wherein the first portion is cylindrical; and
   a second portion which is a partial portion of the injection molded article, and which has
   a first end fixed to the first portion,
   a second end which is free,
   an inner peripheral surface extending from the first end to the second end, and including a first plurality of repeatedly formed undulations,
   an outer peripheral surface extending from the first end to the second end, and including a second plurality of repeatedly formed undulations,
   a first side edge surface arranged between the inner and outer peripheral surfaces, and
   a second side edge surface arranged between the inner and outer peripheral surfaces, wherein the second portion is a cantilever beam which protrudes from the cylindrical first portion.

7. The injection molded article according to claim 6, wherein the inner and outer peripheral surfaces of second portion are curved.

8. An injection molded article comprising:
   a first portion which is a partial portion of the injection molded article; and
   a second portion which is a partial portion of the injection molded article, and which has
   a first end fixed to the first portion,
   a second end which is free,
   an inner peripheral surface extending from the first end to the second end, and including a first plurality of repeatedly formed undulations,
   an outer peripheral surface extending from the first end to the second end, and including a second plurality of repeatedly formed undulations,
   a first side edge surface arranged between the inner and outer peripheral surfaces, and
   a second side edge surface arranged between the inner and outer peripheral surfaces,
   wherein the first portion is cylindrical and has an inner radius and an outer radius,
   wherein the inner peripheral surface of the second portion has a radius of curvature corresponding to the inner radius of the first portion, and
   wherein the outer peripheral surface of the second portion has a radius of curvature corresponding to the outer radius of the first portion.

9. The injection molded article according to claim 8, wherein the first portion and the second portion are portions of a lens barrel.

10. The injection molded article according to claim 8, wherein the first plurality of repeatedly formed undulations have a pitch of about 1 mm long and an amplitude of about 0.3 mm high.

11. The injection molded article according to claim 6, wherein the first plurality of undulations are light intercepting ridges.

12. The injection molded article according to claim 8, wherein the first plurality of undulations are light intercepting ridges.

* * * * *